United States Patent [19]

Tochihara et al.

[11] Patent Number: 5,131,949
[45] Date of Patent: Jul. 21, 1992

[54] INK, INK-JET RECORDING PROCESS, AND INSTRUMENT MAKING USE OF THE INK

[75] Inventors: Shinichi Tochihara, Hadano; Makoto Aoki, Yokohama; Kumiko Mafune, Kawasaki; Akira Nagashima, Tokyo; Kenji Aono, Kawasaki; Osamu Nishiwaki, Atsugi, all of Japan

[73] Assignee: Canon Kabushiki Kaisha, Tokyo, Japan

[21] Appl. No.: 651,424

[22] Filed: Feb. 6, 1991

[30] Foreign Application Priority Data

Feb. 9, 1990 [JP] Japan .............................. 2-030665
Feb. 23, 1991 [JP] Japan .............................. 3-006383

[51] Int. Cl.$^5$ ............................................. C09D 11/02
[52] U.S. Cl. ....................................... 106/20; 106/22
[58] Field of Search ................................. 106/20, 22

[56] References Cited

U.S. PATENT DOCUMENTS

| | | | |
|---|---|---|---|
| 3,816,144 | 6/1974 | Vetter et al. | 106/20 |
| 3,889,269 | 6/1975 | Meyer et al. | 106/22 |
| 4,163,675 | 8/1979 | Hirano et al. | 106/22 |
| 4,202,652 | 5/1980 | Sokol | 106/22 |
| 4,202,652 | 5/1980 | Sokol | 401/196 |
| 4,204,871 | 5/1980 | Johnson et al. | 106/22 |
| 4,229,747 | 10/1980 | Hwang | 346/1.1 |

FOREIGN PATENT DOCUMENTS

| | | |
|---|---|---|
| 1913174 | 6/1970 | Fed. Rep. of Germany . |
| 2258835 | 6/1974 | Fed. Rep. of Germany . |
| 51-8031 | 1/1976 | Japan . |
| 54-104933 | 8/1979 | Japan . |
| 55-29546 | 3/1980 | Japan . |
| 62-14189 | 4/1987 | Japan . |
| 63-297477 | 12/1988 | Japan . |
| 63-297477 | 12/1988 | Japan . |
| 1402047 | 8/0675 | United Kingdom . |
| 1249232 | 10/1971 | United Kingdom . |

*Primary Examiner*—William R. Dixon, Jr.
*Assistant Examiner*—Helene Klemanski
*Attorney, Agent, or Firm*—Fitzpatrick, Cella, Harper & Scinto

[57] ABSTRACT

An ink that includes a recording agent and a liquid medium capable of dissolving or dispersing the recording agent. The ink contains a compound represented by the following Formula (I):

$$R_1-CONH-R_2 \qquad (I)$$

wherein $R_1$ represents an alkyl group or aryl group unsubstituted or substituted with a group selected from a hydroxyl group, a carboxyl group, a sulfone group, an amino group and an acetylamino group; and $R_2$ represents a hydrogen atom, an amide group, an aminoalkyl group, an aliphatic carboxylic acid residual group, or an aryl group unsubstituted or substituted with a group selected from a hydroxyl group, a carboxyl group, a sulfone group, an amino group and an acetylamino group; provided that $R_1$ represents the unsubstituted or substituted aryl group when $R_2$ is a hydrogen atom. The ink is suitably used in ink-jet recording.

17 Claims, 3 Drawing Sheets

INK, INK-JET RECORDING PROCESS, AND INSTRUMENT MAKING USE OF THE INK

BACKGROUND OF THE INVENTION

1. Field of the Invention

The present invention relates to an ink, an ink-jet recording process, and instrument making use of the ink. More particularly it relates to an ink, an ink-jet recording process, a recording unit, an ink-jet recording apparatus and an ink cartridge that are capable of achieving excellent anti-clogging and also making a good record even on non-coated paper such as wood free paper, medium wood free paper or bond paper, i.e., what is called plain paper, commonly used in offices and so forth.

2. Related Background Art

Inks with greatly various manners of composition have been hitherto reported with respect to inks for writing implements such as fountain pens, marking pens and water-based ink ball-point pens and inks for ink-jet recording.

In particular, in recent years, detailed research and development efforts have been made from various approaches such as composition and physical properties, with respect to inks for making a good record even on plain paper such as copy paper, reporting paper, notepaper or letter paper commongly used in offices.

For example, inks usually contain high-boiling organic solvents such as glycols for the purposes of anti-drying, anti-clogging and so forth. When recording is carried out using such inks on a plain paper having a high degree of sizing, ink does not readily penetrate into paper and the part on which a record has been made does not dry well, so that when recorded letters or the like are touched, the hand may be stained with ink or the letters are rubbed to become smeared. Thus, there has been a problem with respect to drying performance of this kind.

Under such circumstances, in order to increase the penetrability of ink into paper, Japanese Patent Application Laid-open No. 55-29546 proposes a method in which a surface active agent is added in ink in a large quantity. In such an instance, the following problems have been caused: feathering occurs very frequently on some kind of paper; when the ink is filled in writing implements, the ink falls in drops from the pen point; and when filled in an ink-jet recording head, the ink recedes from the orifice surface depending on the structural conditions of the head, resulting in no ejection of ink, or on the other hand the whole of the orifice surface becomes wet, also resulting in no ejection of ink.

Japanese Patent Application Laid-open No. 54-104933 and Japanese Patent Publication No. 62-14189 disclose a method in which N,N-bis(polyoxyethylene (or -propylene))-p-toluenesulfonamide is added to ink. According to this method the solubility of dyes can be effectively improved, but it is required to use in combination an organic solvent such as a polyhydric alcohol in a fairly large quantity, so that the method has the problem that the ink has a poor drying performance on a recording medium such as paper, and may cause a stain at a touch even after the lapse of a long period of time. For this reason, it is also required to use in combination a surface active agent in order to improve the penetrability into paper. As a result, feathering may occur to give an insufficient print quality level.

There is another problem that, when the ink is used in ink-jet recording and the ejection of ink is stopped, the above compound recedes from the orifice surface upon evaporation of water, etc., and hence has a poor anti-clogging performance.

Japanese Patent Application Laid-open No. 51-8031 discloses an ink in which a specific carboxylic acid amide derivative is mixed in a water-based ink so that its anti-drying performance can be improved. If, however, this ink is used in ink-jet recording, it is impossible to completely prevent clogging when the ink is ejected again after a pause of recording and also to obtain a superior print quality level.

Japanese Patent Application Laid-open No. 63-297477 also discloses a non-water-based ink in which a dicarboxylic acid diester and a specific carboxylic acid amide derivative are used in combination. It discloses that use of the non-water-based ink has solved the problem of clogging involved in water-based inks. The non-water-based ink, however, has a problem on the safety, and moreover has the disadvantages that it causes feathering very frequently when letters or the like are printed on plain paper, and also has a poor storage stability.

Besides the foregoing, various improvements have ever been attempted. Up to the present, however, no ink is known which can resolve all the problems with respect to the above drying performance, print quality level and also anti-clogging.

SUMMARY OF THE INVENTION

Accordingly, an object of the present invention is to provide an ink that can prevent clogging of pen points of writing implements or clogging of printer heads even when printers are stopped for a while and stopped for a long period of time, enables restoration with ease even when clogging has occurred, and yet can form on a recording medium an image with a high quality level, formed of round dots with less irregular feathering. Other objects of the present invention are to provide an ink-jet recording process making use of it, and to provide instrument making use of such an ink.

The above objects of the present invention can be achieved by the present invention described below. The present invention provides an ink comprising a recording agent and a liquid medium capable of dissolving or dispersing the recording agent, wherein said ink contains a compound represented by the following Formula (I):

$$R_1\text{---CONH---}R_2 \qquad (I)$$

wherein $R_1$ represents an alkyl group or aryl group unsubstituted or substituted with a group selected from a hydroxyl group, carboxyl group, a sulfone group, an amino group and an acetylamino group; and $R_2$ represents a hydrogen atom, an amide group, an aminoalkyl group, an aliphatic carboxylic acid residual group, or an aryl group unsubstituted or substituted with a group selected from a hydroxyl group, a carboxyl group, a sulfone group, an amino group and an acetylamino group; provided that $R_1$ represents the unsubstituted or substituted aryl group when $R_2$ is a hydrogen atom.

The present invention also provides an ink-jet recording process comprising ejecting ink droplets from an orifice in accordance with a recording signal to make a record on a recording medium, wherein the ink as described above is used.

The present invention still also provides a recording unit comprising an ink holder that holds an ink and a head from which the ink is ejected in the form of ink droplets, wherein the ink described above is used as ink.

The present invention further provides an ink cartridge comprising an ink holder that holds an ink, wherein the ink as described above is used as ink.

The present invention still further provides an ink-jet recording apparatus comprising a recording unit comprising an ink holder that has held an ink and a head from which the ink is ejected in the form of ink droplets, wherein the ink as described above is used as ink.

The present invention still further provides an ink-jet recording apparatus comprising a recording head from which ink droplets are ejected, an ink cartridge having an ink holder that hold an ink, and an ink feeder that feeds ink from said ink cartridge to said recording head, wherein the ink as described above is used as ink.

DESCRIPTION OF THE PREFERRED EMBODIMENTS

In order to improve the anti-clogging performance and the properties of giving a high image quality with less feathering, the present inventors made intensive studies on various manners of ink composition. As a result, they have discovered that when the compound of Formula (I) is incorporated in ink, the dye solubility in the ink that has become thick as a result of evaporation of water content is improved and hence clogging can be prevented. They have also discovered that, even if the volatile components in the ink present at the nozzle tips of a printer head have been completely evaporated, the compound of Formula (I) remains together with dyes and hence it becomes possible to moderate the strong aggregation and deposition of dyes and to carry out restoration of nozzles with much greater ease than ever.

The ink containing the compound of Formula (I), when ejected in the form of droplets from the nozzles of a printer head, undergoes an abrupt change in ink composition as it evaporates from and penetrates into a recording medium, so that the compound of Formula (I) is immediately thickened and crystallized, and hence the dots formed by printing can retain round forms with less irregular feathering.

The present invention will be described below in greater detail by giving preferred embodiments. Preferred examples of the compound represented by Formula (I) used in the present invention are shown below.

No. 1

No. 2

No. 3

No. 4

No. 5

No. 6

No. 7

No. 8

No. 9

No. 10

No. 11

-continued

No. 12

No. 13

No. 14

CH₃CONHCH₂CH₂NH₂   No. 15

C₂H₅CONHCH₂CH₂NH₂   No. 16

No. 17

No. 18

No. 19

Of the above compounds, compounds Nos. 6, 8 and 14 are particularly preferred because of their great effect of improving anti-clogging performance and their capability of achieving superior print quality level and fixing performance.

The amount of the above compound to be aded in the ink may differ depending on coloring materials used or other liquid medium components used in combination, and should be in the range of from 0.1 wt. % to 30 wt. %, preferably from 0.1 wt. % to 20 wt. %, and more preferably from 1 wt. % to 10 wt. %.

Its addition in an amount less than 0.1 wt. % may result in a poor effect on anti-clogging, and on the other hand its addition in an amount more than 30 wt. % brings about disadvantages such as an increase in the viscosity of the ink.

As coloring materials used in the present invention, almost all of water-soluble acid dyes, direct dyes, basic dyes and reactive dyes as described in Color Index can be used.

Those which are not described in Color Index can also be used so long as they are water-soluble dyes.

There are no particular limitations on the amount of these dyes used. In usual instances, it may preferably be in the range of from 0.1 wt.% to 15 wt.%, preferably from 0.5 wt.% to 10 wt.%, and more preferably from 1 wt.% to 5 wt.%, based on the total weight of the ink.

In addition to the above components, the ink of the present invention may optionally be incorporated with various additives such as a water-soluble organic solvent, a surface active agent, a pH adjustor, a rust preventive, an antiseptic mildewproofing agent, an antioxidant, an evaporation accelerator, a chelating agent and a water-soluble polymer.

The water-soluble organic solvent may specifically include amides such as dimethylformamide and dimethylacetamide; ketones such as acetone; ethers such as tetrahydrofuran and dioxane; polyalkylene glycols such as polyethylene glycol and polypropylene glycol; alkylene glycols comprising an alkylene group having 2 to 6 carbon atoms, such as ethylene glycol, propylene glycol, butylene glycol, triethylene glycol, 1,2,6-hexanetriol, thiodiglycol, hexylene glycol and diethylene glycol; glycerol; lower alkyl ethers of polyhydric alcohols, such as ethylene glycol methyl (or ethyl) ether, diethylene glycol methyl (or ethyl) ether and triethylene glycol monomethyl (or ethyl) ether; N-methyl-2-pyrrolidone, 1,3-dimethyl-2-imidazolidinone, triethanolamine, sulfolane, dimethyl sulfoxide, and aliphatic monohydric alcohols having 1 to 10 carbon atoms.

The above water-soluble organic solvent may preferably be contained in an amount ranging from 1 wt.% to 40 wt.%, and more preferably from 3 wt.% to 30 wt.%. Wetting agents such as polyhydric alcohols commonly used particularly for the purpose of anti-clogging may not be used in a large quantity because of the anti-clogging effect attributable to an inorganic acid salt of the compound represented by Formula (I). There was rather obtained the result that when a wetting agent was contained in an amount of 40 wt.% or more the print drying performance on paper and the print quality level were lowered.

The water used in the ink is contained usually in an amount of from 40 wt.% to 95 wt.% based on the total weight of the ink. An amount less than 40 wt.% brings about the problems that the viscosity increases, the feathering tends to occur and the fixing performance becomes poor. An amount more than 95 wt.% results in excessive volatile components to lower anti-stick performance.

The ink of the present invention is particularly preferable in the case when applied in ink-jet recording of the type the ink is ejected utilizing a phenomenon of ink bubbling caused by heat energy, and has the features that ejection is highly stabilized and no satellite dots are generated. In this case, however, the values of thermal properties, e.g., specific heat, coefficient of thermal expansion, and thermal conductivity must be controlled in some instances.

The ink of the present invention can resolve the problems concerning the feathering, the drying performance of recorded letters or the like and the penetrability that arise when recording is carried out on plain paper or the like. At the same time, it can match the recording head in an improved state. From these viewpoints, the physical properties of the ink itself should be controlled to give a surface tension of from 30 dyne/cm to 68 dyne/cm at 25° C., and a viscosity of not more than 15 cP, preferably not more than 10 cP, and more preferably not more than 5 cP.

The ink of the present invention can be particularly preferably used in the ink-jet recording in which recording is carried out by ejecting ink droplets by the action of heat energy. Needless to say, however, it can also be used for usual writing implements.

The method and apparatus suited to carry out recording by the use of the ink of the present invention may include a method and apparatus in which a heat energy corresponding with a recording signal is imparted to the ink held in the interior of a recording head so that ink droplets are generated by the action of the heat energy.

Figure 1A:
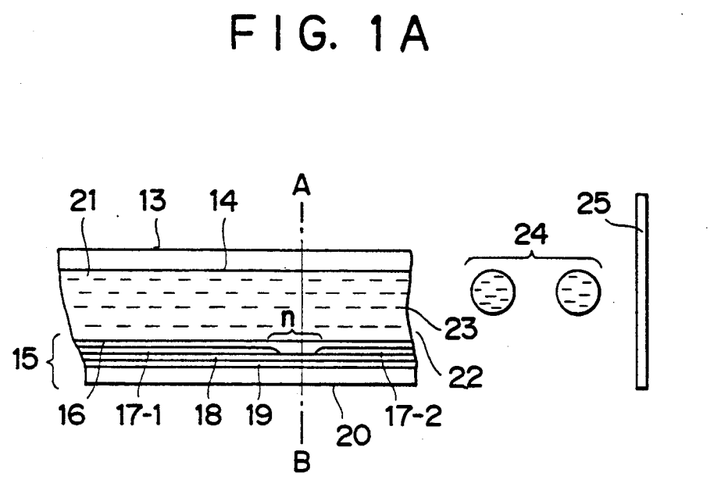
FIGS. 1A and 1B illustrate a vertical cross section and a transverse cross section, respectively, of a head of an ink-jet recording apparatus.
Figure 1B:
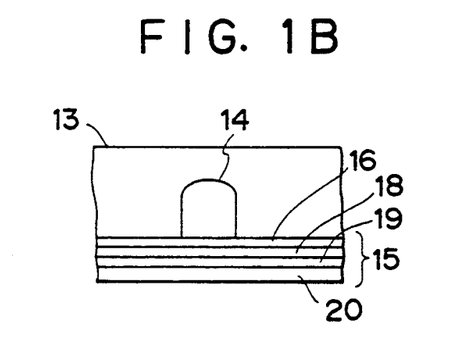
Figure 2:
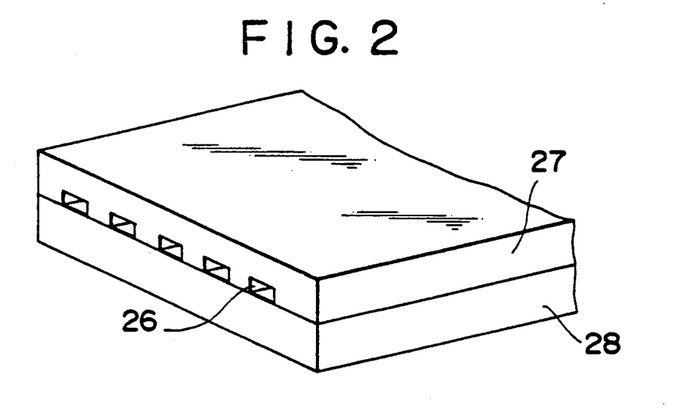
FIG. 2 is a perspective illustration of a head comprised of a multiple set of the heads as shown in FIGS. 1A and 1B.

FIGS. 1A, 1B and 2 show an example of the construction of the head, which is a main component of the apparatus.

A head 13 is formed by bonding a glass, ceramic or plastic plate or the like having a channel 14 through which ink is passed, to a heating head 15 used in thermal recording (the drawing shows a head, to which, however, is not limited). The heating head 15 is comprised of a protective film 16 formed of silicon oxide or the like, a heating resistor layer 18 formed of aluminum electrodes 17-1 and 17-2, nichrome and so forth, a heat accumulating layer 19, and a substrate 20 of alumina, etc. with good heat dissipation properties.

Ink 21 the ejection orifice (a minute opening) 22 and a meniscus 23 is formed there by a pressure P.

Now, upon application of electric signals to the electrodes 17-1 and 17-2, heat is abruptly generated at the region denoted by n in the thermal head 15, so that bubbles are generated in the ink 21 coming into contact with this region. The pressure thus produced thrusts out the meniscus 23 and the ink 21 is ejected from the orifice 22 in the form of recording minute drops 24 to fly against a recording medium 25. FIG. 2 illustrates the appearance of a multi-head comprising the head as shown in FIG. 1A arranged in a large number. The multi-head is prepared by closely adhering a glass plate 27 having a multi-channel 26, to a heating head 28 similar to the head as illustrated in FIG. 1A.

FIG. 1A is a cross-sectional view of the head 13 along its ink flow path, and FIG. 1B is a cross-sectional view along the line A-B.

Figure 3:
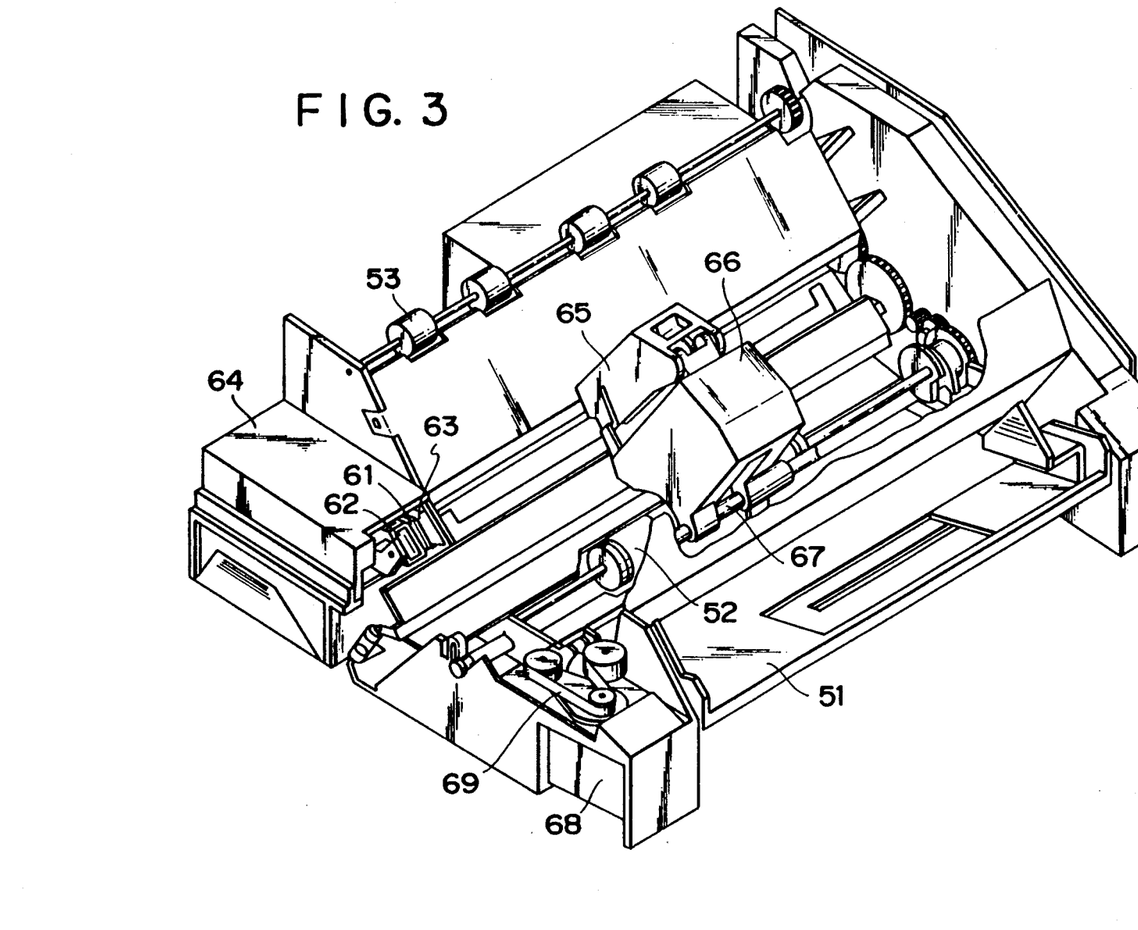
FIG. 3 is a perspective illustration of an example of ink-jet recording apparatus.

FIG. 3 shows an example of an ink-jet recording apparatus in which such a head has been incorporated.

In FIG. 3, the numeral 61 denotes a blade serving as a wiping member, one end of which is a stationary end retained by a blade-retaining member to have the form of a cantilever. The blade 61 is provided at the position adjacent to the region in which a recording head makes a record. In the present example, the blade is retained in such a form that it projects into the course through which the recording head is moved. The numeral 62 denotes a cap, which is provided at the home position adjacent to the blade 61, and is so constituted that it moves in the direction perpendicular to the direction in which the recording head is moved and comes into contact with the face of ejection openings to carry out capping. The numeral 63 denotes an absorber provided adjoiningly to the blade 61, and, similar to the blade 61, is retained in such a form that it projects to the course through which the recording head is moved. The above blade 61, cap 62 and absorber 63 constitute an ejection restoration assembly 64, where the blade 61 and the absorber 63 remove the water, dust or the like from the ink ejection opening face.

The numeral 65 denotes the recording head having an ejection energy generating means and ejects ink to the recording medium set opposingly to the ejection opening face provided with ejection openings, to carry out recording. The numeral 66 denotes a carriage on which the recording head 65 is mounted so that the recording head 65 can be moved. The carriage 66 is slidably associated with a guide shaft 67. Part of the carriage 66 is connected (not shown) with a belt 69 driven by a motor 68. Thus, the carriage 66 can be moved along the guide shaft 67 and hence the recording head 65 can be moved from a recording region to a region adjacent thereto.

The numeral 51 denotes a paper feeding part from which recording mediums are inserted, and numeral 52, denotes a paper feed roller driven by a motor (not shown). With such construction, the recording medium is fed to the position opposing to the ejection opening face of the recording head, and, with progress of recording, outputted from a paper output section provided with a paper output roller 53.

In the above constitution, the cap 62 of the head restoration assembly 64 is receded from the moving course of the recording head 65 when the recording head 65 is returned to its home position, e.g., after completion of recording, and the blade 61 stands projected into the moving course. As a result, the ejection opening face of the recording head 65 is wiped. When the cap 62 comes into contact with the ejection opening face of the recording head 65 to carry out capping, the cap 62 is moved in such a way that it projects into the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 4:
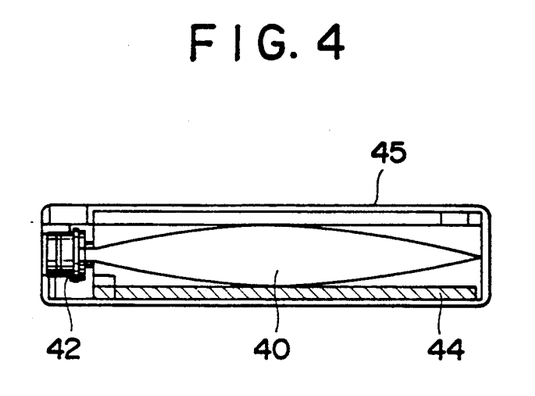
FIG. 4 is a cross-sectional illustration of an ink cartridge.

FIG. 4 shows an example of an ink cartridge that holds the ink being fed to the head through an ink-feeding member as exemplified by a tube. Herein the numeral 40 denotes an ink holder that holds the feeding ink, as exemplified by an ink bag. The top thereof is provided with a stopper 42 made of rubber. A needle (not shown) may be inserted to this stopper 42 so that the ink in the ink bag 40 can be fed to the head. The numeral 44 denotes an absorber that receives a waste ink.

It is preferred in the present invention that the ink holder is formed of a polyolefin, in particular, polyethylene, at its surface with which the ink comes into contact.

Figure 5:
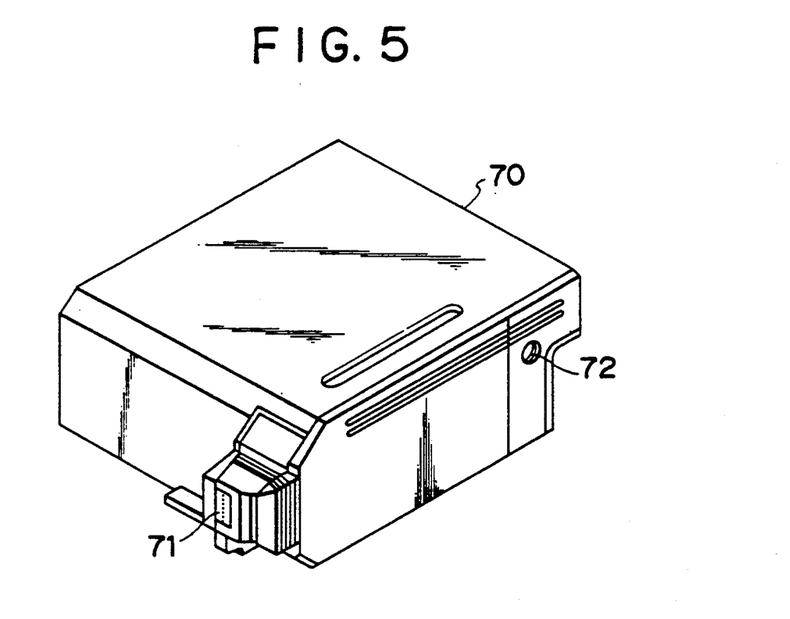
FIG. 5 is a perspective illustration of a recording unit.

The ink-jet recording apparatus used in the present invention may not be limited to the apparatus as described above in which the head and the ink cartridge are separately provided, and a device can also be preferably used in which these are integrally formed as shown in FIG. 5.

In FIG. 5, the numeral 70 denotes a recording unit, in the interior of which an ink holder that holds an ink, as exemplified by an ink absorber, is contained. The recording unit is so constructed that the ink in such an ink absorber is ejected in the form of ink droplets from a head 71 having a plurality of orifices. As a material for the ink absorber, it is preferred in the present invention to use polyurethane.

The numeral 72 denotes an air path opening through which the interior of the recording unit is communicated with the air.

This recording unit 70 can be used in place of the recording head shown in FIG. 3, and is detachably mounted to the carriage 66.

EXAMPLES

The present invention will be described below by giving Examples and Comparative Examples. In the following, "part(s)" or "%" is by weight.

EXAMPLES 1 to 7, Comparative EXAMPLES 1 to 6

The following components were mixed and throughly stirred to carry out dissolution. Thereafter, the resulting solution was subjected to pressure filtration using Fluoro pore Filter (trade name; manufactured by Sumitomo Electric Industries, Ltd.) of 0.45 μm in pore size. Inks of the present invention and those for comparison were thus prepared.

| Ink composition of Example 1: | |
| --- | --- |
| C.I. Direct Black 154 | 4 parts |
| Compound No. 5 | 7 parts |
| Triethylene glycol | 10 parts |
| Water | 79 parts |
| Ink composition of Example 2: | |
| C.I. Food Black 2 | 3 parts |
| Compound No. 6 | 5 parts |
| Diethylene glycol | 5 parts |
| Isopropyl alcohol | 4 parts |
| Water | 83 parts |
| Ink composition of Example 3: | |
| C.I. Direct Blue 86 | 3.5 parts |
| Compound No. 7 | 10 parts |
| Glycerol | 10 parts |
| Surface active agent (Scorerol #900) | 0.1 part |
| Water | 76.4 parts |
| Ink compositions of Example 4: | |
| C.I. Acid Red 35 | 3 parts |
| Compound No. 8 | 4 parts |
| Polyethylene glycol #300 | 10 parts |
| Diethylene glycol monophenyl ether | 3 parts |
| Water | 80 parts |
| Ink compositions of Example 5: | |
| C.I. Direct Black 154 | 4 parts |
| Compound No. 9 | 6 parts |
| Triethylene glycol | 6 parts |
| Diethylene glycol | 4 parts |
| Water | 80 parts |
| Ink compositions of Example 6: | |
| C.I. Food Black 2 | 3 parts |
| Compound No. 10 | 5 parts |
| Diethylene glycol | 5 parts |
| Ethanol | 5 parts |
| Water | 82 parts |

Ink compositions of Example 7

The same as in Example 3 except that the compound No. 7 used therein was replaced with the compound No. 11.

Ink of Comparative Examples 1 to 4

The same as in Examples 1 to 4, respectively, except that the compounds of the present invention as used therein were replaced with water.

Ink Composition of Comparative Examples 5 and 6

The same as in Example 4 except that the compound No. 8 used therein was replaced with $CH_3CHOH-CONH_2$ and $CH_3CONHCH_2CH_2OH$ to give inks of Comparative Examples 5 and 6, respectively.

Next, recording was carried out using the resulting inks of Examples 1 to 7 and Comparative Examples 1 to 6 and also using as an ink-jet recording apparatus an ink-jet printer BJ-130A (trade name; manufactured by Canon Inc.) provided with a heater element by means of which a heat energy is imparted to the ink so that ink droplets are ejected, and the anti-clogging performance and the print quality level were evaluated. Results obtained are shown in Table 1.

(Evaluation method and evaluation criterions)

(1) Evaluation on anti-clogging performance

A given ink was charged in the printer. English letters were continuously printed for 10 minutes and thereafter the printing was stopped. After the printer was left to stand for 30 days in a capped state (conditions for standing: 40° C., 10±5% RH), operation for restoration of nozzle clogging was carried out and then English letters were again printed. The evaluation was made on the basis of the times of the operation for restoration, carried out until the initial state of prints can be reproduced, and also on whether or not defective prints were formed, e.g., letters were blurred or incomplete.

AA: Printing of the same performance as the initial printing was possible without operation for restoration.

A: Printing of the same performance as the initial printing was possible after restoration was carried out once to 3 times B: Printing of the same performance as the initial printing was possible after restoration was carried out 4 to 9 times.

C: Printing of the same performance as the initial printing was possible after restoration was carried out 10 times or more.

(2) Evaluation on print quality level

Letters were printed on a commercially available copy paper (Xerox 4024), and then left to stand for 1 hour or more. Thereafter, the feathering on the level of dots and the sharpness of edges were evaluated under environmental conditions of 25° C. and 60% RH.

A: No feathering with sharp edges.

B: Feathering occurred a little, with slightly blurred edges.

C: Feathering greatly occurred, with blurred dots and edges.

TABLE 1

| Evaluation item | Example | | | | | | | Comparative Example | | | | | |
| --- | --- | --- | --- | --- | --- | --- | --- | --- | --- | --- | --- | --- | --- |
| | 1 | 2 | 3 | 4 | 5 | 6 | 7 | 1 | 2 | 3 | 4 | 5 | 6 |
| Anti-clogging: | A | AA | A | AA | B | B | B | C | C | C | C | C | B |
| Print quality level: | A | A | A | A | B | A | A | C | B | B | C | C | C |

EXAMPLES 8 TO 11

Inks were prepared in the same manner as in Examples 1 to 4 except that the compounds No. 5 to No. 8 used in composing the ink of Examples 1 to 4 were replaced with the following compounds, respectively. Evaluation was also made in the same manner as in Examples 1 to 4. Results obtained are shown in Table 2.

Example 8: Compound No. 1
Example 9: Compound No. 2
Example 10: Compound No. 3
Example 11: Compound No. 4

TABLE 2

| Evaluation item | Example | | | |
|---|---|---|---|---|
| | 8 | 9 | 10 | 11 |
| Anti-clogging: | A | A | A | A |
| Print quality level: | A | A | A | A |

EXAMPLES 12 TO 16

Inks with the following components were prepared in the same manner as in Examples 1 to 7.

| Ink composition of Example 12: | |
|---|---|
| C.I. Food Black 2 | 3 parts |
| Ethyl alcohol | 5 parts |
| Compound No. 15 | 10 parts |
| Water | 82 parts |
| Ink composition of Example 13: | |
| C.I. Direct Blue 199 | 3 parts |
| Diethylene glycol | 7 parts |
| Ethyl alcohol | 5 parts |
| Compound No. 14 | 5 parts |
| Water | 80 parts |

Ink composition of Example 14

The same ink composition as in Example 13 except that the dye used therein was replaced with C.I. Direct Yellow 86 and the compound No. 14 was replaced with the compound No. 13.

Ink composition of Example 15

The same ink composition as in Example 13 except that the dye used therein was replaced with C.I. Direct Red 227 and the compound No. 14 was replaced with the compound No. 12.

| Ink composition of Example 16: | |
|---|---|
| C.I. Direct Black 19 | 3 parts |
| Diethylene glycol | 7 parts |
| Isopropyl alcohol | 3 parts |
| Compound No. 15 | 5 parts |
| Water | 82 parts |

Using these inks, plain paper printing was carried out on an ink-jet printer BJ-130A, manufactured by Canon Inc. PPC paper (SK paper, DK paper) available from Canon Inc. was used as the plain paper. As a result, the fixing performance was found to be as good as 15 seconds or less in respect of all kinds of paper. The OD (measured with a Macbeth densitometer) was 1.3 or more in respect of all kinds of paper, showing that prints with high density were obtained. The print quality level was also found good since dots with substantially perfect circles were obtained without influence from the unevenness of paper. With regard to the anti-stick properties, the head was left to stand for a month in a capped state in an environment of 60° C./5% RH, and thereafter a head restoration pump was operated to confirm that the ink was normally ejected. Thus the anti-stick properties were found very good. With regard to the initial ejection performance, the ink was ejected in an environment of 15° C./10% RH and, after the head was kept uncapped for 2 minutes, the ink was again ejected. As a result, the ejection of ink was in a normal state from the first shot, and was found very good.

For comparison, the plain paper printing was carried out using an ink having the composition of Example 12 from which the compound No. 15 was removed. As a result, the fixing performance, OD and print quality level were superior on substantially the same level as in Example 1. With regard to the anti-clogging properties, however, when the head was left to stand for a month in a capped state in an environment of 60° C./5% RH and thereafter a head restoration pump was operated, clogging of nozzles occurred and therefore no ink was sucked and ejected.

According to the present invention it is possible to carry out recording with a high reliability, which may cause no clogging for a long period of time at pen points or fine orifice tips, and also possible to achieve recording free of feathering and with superior print quality level not only on coated paper prepared for ink-jet recording but also on non-coated paper commonly used in offices, i.e., what is called plain paper, such as copy paper, reporting paper, notepaper or letter paper.

We claim:

1. An aqueous ink comprising a recording agent and a liquid medium capable of dissolving or dispersing the recording agent, wherein said ink contains a compound represented by the following Formula (I):

$$R_1-CONH-R_2 \qquad (I)$$

wherein $R_1$ represents an alkyl group or aryl group unsubstituted or substituted with a group selected from a hydroxyl group, a carboxyl group, a sulfone group, an amino group and an acetylamino group; and $R_2$ represents a hydrogen atom, an amide group, an aminoalkyl group, an aliphatic carboxylic acid residual group, or a phenyl group unsubstituted or substituted with a group selected from a hydroxyl group, a carboxyl group, a sulfone group, an amino group and an acetylamino group; provided that $R_1$ represents the unsubstituted or substituted aryl group when $R_2$ is a hydrogen atom; and wherein said compound represented by Formula (I) is contained in an amount of from 0.1 wt. % to 30 wt. % based on the total weight of the ink.

2. An ink according to claim 1, wherein water is contained in an amount of from 40 wt. % to 95 wt. % based on the total weight of the ink.

3. An ink according to claim 1, wherein said liquid medium comprises a water-soluble organic solvent.

4. In an ink-jet recording process in which ink droplets are ejected from an orifice in accordance with a recording signal to make a record on a recording medium, the improvement comprising employing an aqueous ink which contains a compound represented by the following Formula (I):

$$R_1-CONH-R_2 \qquad (I)$$

wherein $R_1$ represents an alkyl group or aryl group unsubstituted or substituted with a group selected from a hydroxyl group, a carboxyl group, a sulfone group, an amino group and an acetylamino group; and $R_2$ represents a hydrogen atom, an amide group, an aminoalkyl group, an aliphatic carboxylic acid residual group, or a phenyl group unsubstituted or substituted with a group selected from a hydroxyl group, a carboxyl group, a sulfone group, an amino group and an acetylamino group; provided that $R_1$ represents the unsubstituted or substituted aryl group when $R_2$ is a hydrogen atom; and wherein said compound represented by Formula (I) is contained in an amount of from 0.1 wt. % to 30 wt. % based on the total weight of the ink.

5. In an ink-jet recording process according to claim 4, wherein said recording medium comprises a non-coated paper.

6. An ink-jet recording process according to claim 4, wherein a heat energy is acted on the ink to eject said ink droplets.

7. A recording unit comprising an ink holder that holds an aqueous ink and a head from which the ink is ejected in the form of ink droplets, wherein said ink contains a compound represented by the following Formula (I):

$$R_1-CONH-R_2 \qquad (I)$$

wherein $R_1$ represents an alkyl group or aryl group unsubstituted or substituted with a group selected from a hydroxyl group, a carboxyl group, a sulfone group, an amino group and an acetylamino group; and $R_2$ represents a hydrogen atom, an amide group, an aminoalkyl group, an aliphatic carboxylic acid residual group, or a phenyl group unsubstituted or substituted with a group selected from a hydroxyl group, a carboxyl group, a sulfone group, an amino group and an acetylamino group; provided that $R_1$ represents the unsubstituted or substituted aryl group when $R_2$ is a hydrogen atom; and wherein said compound represented by Formula (I) is contained in an amount of from 0.1 wt. % to 30 wt. % based on the total weight of the ink.

8. A recording unit according to claim 7, wherein said ink holder is formed of polyurethane.

9. A recording unit according to claim 7, wherein said head comprises a head in which a heat energy is acted on the ink so that the ink droplets are ejected.

10. An ink cartridge comprising an ink holder that holds an aqueous ink, wherein said ink contains a compound represented by the following Formula (I):

$$R_1-CONH-R_2 \qquad (I)$$

wherein $R_1$ represents an alkyl group or aryl group unsubstituted or substituted with a group selected from a hydroxyl group, a carboxyl group, a sulfone group, an amino group and an acetylamino group; and $R_2$ represents a hydrogen atom, an amide group, an aminoalkyl group, an aliphatic carboxylic acid residual group, or a phenyl group unsubstituted or substituted with a group selected from a hydroxyl group, a carboxyl group, a sulfone group, an amino group and an acetylamino group; provided that $R_1$ represents the unsubstituted or substituted aryl group when $R_2$ is a hydrogen atom; and wherein said compound represented by Formula (I) is contained in an amount of from 0.1 wt. % to 30 wt. % based on the total weight of the ink.

11. An ink cartridge according to claim 10, wherein said ink holder has a liquid-contact surface formed of a polyolefin.

12. An ink-jet recording apparatus comprising a recording unit comprising an ink holder that holds an aqueous ink and a head from which the ink is ejected in the form of ink droplets, wherein said ink contains a compound represented by the following Formula (I):

$$R_1-CONH-R_2 \qquad (I)$$

wherein $R_1$ represents an alkyl group or aryl group unsubstituted or substituted with a group selected from a hydroxyl group, a carboxyl group, a sulfone group, an amino group and an acetylamino group; and $R_2$ represents a hydrogen atom, an amide group, an aminoalkyl group, an aliphatic carboxylic acid residual group, or a phenyl group unsubstituted or substituted with a group selected from a hydroxyl group, a carboxyl group, a sulfone group, an amino group and an acetylamino group; provided that $R_1$ represents the unsubstituted or substituted aryl group when $R_2$ is a hydrogen atom; and wherein said compound represented by Formula (I) is contained in an amount of from 0.1 wt. % to 30 wt. % based on the total weight of the ink.

13. An ink-jet recording apparatus according to claim 12, wherein said ink holder is formed of polyurethane.

14. An ink-jet recording apparatus according to claim 12, wherein said head comprises a head in which a heat energy is acted on the ink so that the ink droplets are ejected.

15. An ink-jet recording apparatus comprising a recording head from which ink droplets are ejected, an ink cartridge having an ink holder that holds an aqueous ink, and an ink feeder that feeds ink from said ink cartridge to said recording head, wherein said ink contains a compound represented by the following Formula (I):

$$R_1-CONH-R_2 \qquad (I)$$

wherein $R_1$ represents an alkyl group or aryl group unsubstituted or substituted with a group selected from a hydroxyl group, a carboxyl group, a sulfone group, an amino group and an acetylamino group; and $R_2$ represents a hydrogen atom, an amide group, an aminoalkyl group, an aliphatic carboxylic acid residual group, or a phenyl group unsubstituted or substituted with a group selected from a hydroxyl group, a carboxyl group, a sulfone group, an amino group and an acetylamino group; provided that $R_1$ represents the unsubstituted or substituted aryl group when $R_2$ is a hydrogen atom; and wherein said compound represented by Formula (I) is contained in an amount of from 0.1 wt. % to 30 wt. % based on the total weight of the ink.

16. An ink-jet recording apparatus according to claim 15, wherein said ink holder has a liquid-contact surface formed of a polyolefin.

17. An ink-jet recording apparatus according to claim 15, wherein said recording head comprises a head in which a heat energy is acted on the ink so that the ink droplets are ejected.

* * * * *

UNITED STATES PATENT AND TRADEMARK OFFICE
CERTIFICATE OF CORRECTION

PATENT NO. : 5,131,949

DATED : July 21, 1992

INVENTOR(S) : Tochihara et al.

It is certified that error appears in the above-identified patent and that said Letters Patent is hereby corrected as shown below:

On the title page:

[30] Foreign Application Priority Data:

"Feb. 23, 1991" should read --Jan. 23, 1991--.

COLUMN 1:

Line 29, "commongly" should read --commonly--; and
Line 44, "in" (first occurrence) should read --to--.

COLUMN 3:

Line 19, "hold" should read --holds--.

COLUMN 6:

Line 45, "type" should read --type where--.

COLUMN 7:

Line 14, "is" (first occurrence) should read --it is--; and
Line 20, "Ink 21 the" should read --The ink 21 reaches an--.

COLUMN 8:

Line 6, "52," should read --52--; and
Line 11, "outputted" should read --is outputted--.

UNITED STATES PATENT AND TRADEMARK OFFICE
CERTIFICATE OF CORRECTION

PATENT NO. : 5,131,949
DATED : July 21, 1992
INVENTOR(S) : Tochihara et al.

It is certified that error appears in the above-identified patent and that said Letters Patent is hereby corrected as shown below:

COLUMN 9:

```
Line 34, "compositions" should read --composition--;
Line 39, "compositions" should read --composition--;
Line 44, "compositions" should read --composition--;
Line 57, "compositions" should read --composition--; and
Line 61, "Ink of" should read --Ink composition of--.
```

COLUMN 11:

```
Line 53, "uneveness" should read --unevenness--.
```

COLUMN 13:

```
Line 4, "An" should read --In an--.
```

Signed and Sealed this

Twenty-first Day of September, 1993

*Attest:*

BRUCE LEHMAN

*Attesting Officer*     *Commissioner of Patents and Trademarks*